United States Patent
Hsu et al.

(10) Patent No.: US 9,581,871 B2
(45) Date of Patent: Feb. 28, 2017

(54) DISPLAY PANEL COMPRISING A WIRE DISPOSED AND SANDWICHED IN BETWEEN A SEALANT AND A PLANARIZATION LAYER AND METHOD FOR MANUFACTURING THE SAME

(71) Applicant: Au Optronics Corporation, Hsinchu (TW)

(72) Inventors: Wen-Yi Hsu, Taoyuan County (TW); Maw-Song Chen, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 162 days.

(21) Appl. No.: 14/279,321

(22) Filed: May 16, 2014

(65) Prior Publication Data

US 2014/0340625 A1 Nov. 20, 2014

(30) Foreign Application Priority Data

May 16, 2013 (TW) .............................. 102117401 A (51) Int. Cl.
G02F 1/1333 (2006.01)
G02F 1/1345 (2006.01)

(52) U.S. Cl.
CPC ...... *G02F 1/13458* (2013.01); *G02F 1/13454* (2013.01)

(58) Field of Classification Search
CPC ................. G02F 2001/133357; G02F 1/13458
See application file for complete search history.

(56) References Cited

U.S. PATENT DOCUMENTS

| 7,199,855 | B2 | 4/2007 | Yoshimi et al. |
| 7,456,909 | B2 | 11/2008 | Park |
| 7,589,801 | B2 | 9/2009 | Yoon |
| 7,679,693 | B2 | 3/2010 | Park |
| 7,864,256 | B2 | 1/2011 | Yoon |
| 8,120,742 | B2 | 2/2012 | Chen et al. |
| 8,237,904 | B2 | 8/2012 | Chen et al. |
| 2006/0023135 | A1 | 2/2006 | Park |

(Continued)

FOREIGN PATENT DOCUMENTS

| CN | 1727975 | 2/2006 |
| CN | 101089714 | 12/2007 |

(Continued)

*Primary Examiner* — Paul Lee
(74) *Attorney, Agent, or Firm* — Jianq Chyun IP Office (57) ABSTRACT

A display panel, including a device substrate, an opposite substrate, a sealant, and a display medium, is provided. A pixel array of the device substrate is located in a display region, and a periphery circuit of the device substrate is located in a non-display region, wherein the periphery circuit includes at least one driving device, a planarization layer, and at least one wire. The planarization layer covers the driving device. The wire is located on the planarization layer, and the wire is electrically connected with the driving device and disposed to overlap the driving device. The opposite substrate is located opposite to the device substrate, and the sealant is located in the non-display region therebetween and covers the wire. The display medium is located between the device substrate, the opposite substrate, and the sealant. A manufacturing method of a display panel is also provided.

14 Claims, 10 Drawing Sheets

(56) References Cited

U.S. PATENT DOCUMENTS

| | | |
|---|---|---|
| 2007/0291194 A1 | 12/2007 | Yoon |
| 2008/0068364 A1 | 3/2008 | Park et al. |
| 2009/0141205 A1 | 6/2009 | Park |
| 2009/0296012 A1 | 12/2009 | Yoon |
| 2010/0045912 A1 | 2/2010 | Chen et al. |
| 2011/0102696 A1* | 5/2011 | Yamazaki ........... G02F 1/13458 349/42 |
| 2012/0050241 A1 | 3/2012 | Huang et al. |
| 2012/0092578 A1 | 4/2012 | Chen et al. |
| 2012/0105788 A1 | 5/2012 | Zhang et al. |
| 2013/0003006 A1 | 1/2013 | Wang et al. |

FOREIGN PATENT DOCUMENTS

| | | |
|---|---|---|
| TW | 201009432 | 3/2010 |
| TW | 201209478 | 3/2012 |
| TW | I372282 | 9/2012 |
| TW | 201300906 | 1/2013 |

\* cited by examiner

DISPLAY PANEL COMPRISING A WIRE DISPOSED AND SANDWICHED IN BETWEEN A SEALANT AND A PLANARIZATION LAYER AND METHOD FOR MANUFACTURING THE SAME

CROSS-REFERENCE TO RELATED APPLICATION

This application claims the priority benefit of Taiwan application serial no. 102117401, filed on May 16, 2013. The entirety of the above-mentioned patent application is hereby incorporated by reference herein and made a part of this specification.

BACKGROUND OF THE INVENTION

Field of the Invention

The invention relates to a display panel and a manufacturing method thereof, and particularly to a liquid crystal display panel and a manufacturing method thereof.

Description of Related Art

With the advance of technology and development of the semiconductor industry in these years, digital products, such as personal digital assistant (PDA), mobile phone, smart phone, notebook (NB), etc., become more and more common. And, these digital products are being developed to be more convenient, multi-functional, and pleasing in appearance to provide the users with more options. As the users' demand for digital products increases, the display screen, which is an important part to the digital products, becomes the focus of the designers' attention. In particular, liquid crystal display panel (LCD panel) has become the mainstream in the development of display screens.

Generally speaking, a liquid crystal display panel is manufactured by assembling a device substrate and an opposite substrate with a sealant, and then filling a liquid crystal layer between the device substrate and the opposite substrate. Specifically, the device substrate may be an active array substrate or a passive array substrate, and the opposite substrate may be a general blank substrate or a substrate provided with an electrode film or color filter layer. The liquid crystal display panel includes a display region and a non-display region, wherein the display region is configured for displaying images. Therefore, components of the liquid crystal display panel, for displaying images, e.g. the pixel array and display medium, are disposed in the display region. On the contrary, the non-display region does not display images, and thus the other components, not for displaying images, e.g. the circuit, are disposed in the non-display region, so as to avoid affecting the appearance of the liquid crystal display panel. To meet the requirements of fabricating processes, driving devices and wires of the circuit in the non-display region are generally arranged transversely on the substrate, such that the non-display region of the liquid crystal display panel has a broader border.

SUMMARY OF THE INVENTION

The invention provides a display panel which is designed to have a narrow border.

The invention provides a manufacturing method for manufacturing a display panel having a narrow border.

The invention provides a display panel which includes a display region and a non-display region. The display panel includes a device substrate, an opposite substrate, a sealant, and a display medium. The device substrate includes a substrate and a pixel array and a periphery circuit which are disposed on the substrate. The pixel array is located in the display region and the periphery circuit is located in the non-display region, wherein the periphery circuit includes at least one driving device, a planarization layer, and at least one wire. The planarization layer covers the driving device. The wire is located on the planarization layer, wherein the wire is electrically connected with the driving device and overlaps the driving device. The opposite substrate is disposed opposite to the device substrate. The sealant is located in the non-display region between the device substrate and the opposite substrate, so as to assemble the device substrate and the opposite substrate together, wherein the sealant covers the wire of the device substrate, and the wire is disposed between the sealant and the planarization layer. The display medium is located between the device substrate, the opposite substrate, and the sealant.

The invention provides a manufacturing method of a display panel, which includes the following steps. A substrate, which includes a display region and a non-display region, is provided. A thin film transistor array is formed in the display region of the substrate, and at the same time at least one driving device is formed in the non-display region of the substrate. A planarization layer is formed to cover the thin film transistor array and the driving device. A pixel electrode is formed on the planarization layer in the display region, and the pixel electrode is electrically connected with the thin film transistor array to form a pixel array. At least one wire is formed on the planarization layer in the non-display region, wherein the wire and the driving device are disposed to overlap each other, and the wire is electrically connected with the driving device. A sealant is formed on the planarization layer and covers the wire. An opposite substrate and the substrate are assembled together by the sealant. Moreover, a display medium is formed between the opposite substrate, the substrate, and the sealant.

Based on the above, according to the display panel and the manufacturing method of the invention, the periphery circuit of the device substrate is disposed in the non-display region, wherein the wire of the periphery circuit is located above the planarization layer and electrically connected with the driving device, and the wire and the driving device are disposed to overlap each other, so as to reduce the width of the non-display region of the display panel. Thus, the display panel of the invention has the narrow border design, and the manufacturing method of the invention is adapted for manufacturing the display panel having the narrow border design.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
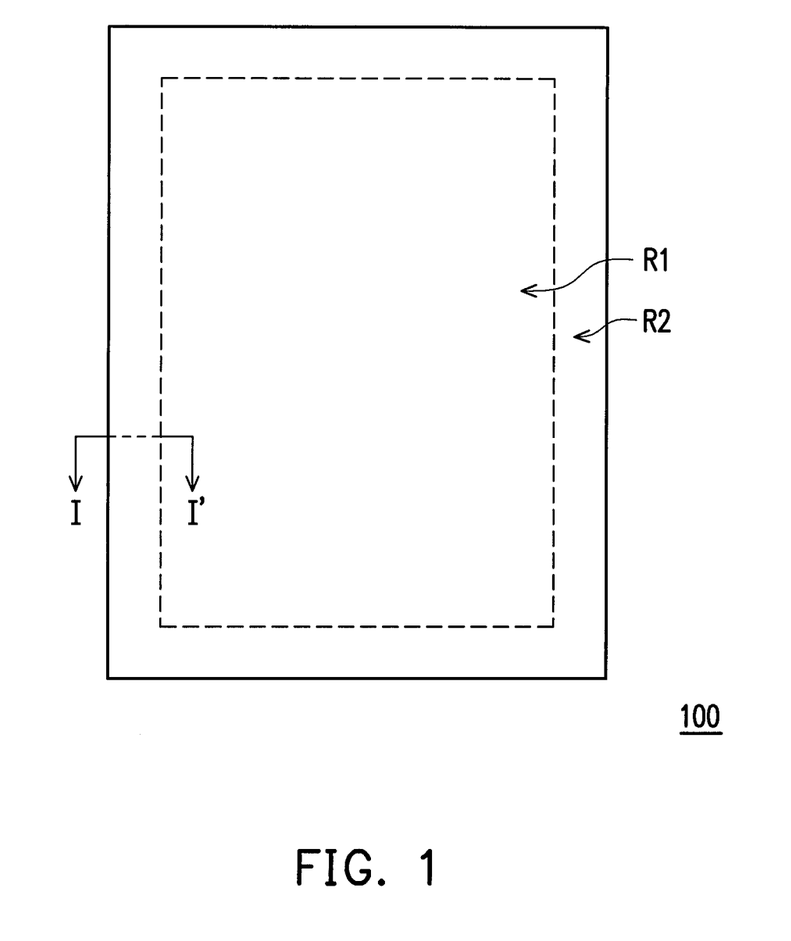
FIG. 1 is a schematic view of a display panel according to an embodiment of the invention.

FIG. 1 is a schematic view of a display panel according to an embodiment of the invention. With reference to FIG. 1, in this embodiment, a display panel 100 includes a display region R1 and a non-display region R2. The display panel 100 displays an image in the display region R1. Therefore, devices, e.g. pixel array and display medium, of the display panel 100 for displaying the image are disposed in the display region R1. On the contrary, the non-display region R2 does not display any image, and therefore, a periphery circuit is generally disposed in the non-display region R2, so as to avoid affecting the appearance of the display panel 100. In this embodiment, the display region R1 is a rectangular area while the non-display region R2 is a hollow rectangular area surrounding and adjacent to the display region R1. In other embodiments of the invention, the display region R1 may be circular, elliptic, polygonal, or have other shapes. A shape of the non-display region R2 may be varied in accordance with the shape of the display region R1. Nevertheless, it should be noted that the invention is not limited thereto. In addition, the display panel 100 of this embodiment is an amorphous silicon liquid crystal display panel (a-Si LCD panel), for example; however, the invention is not limited thereto.

Figure 2:
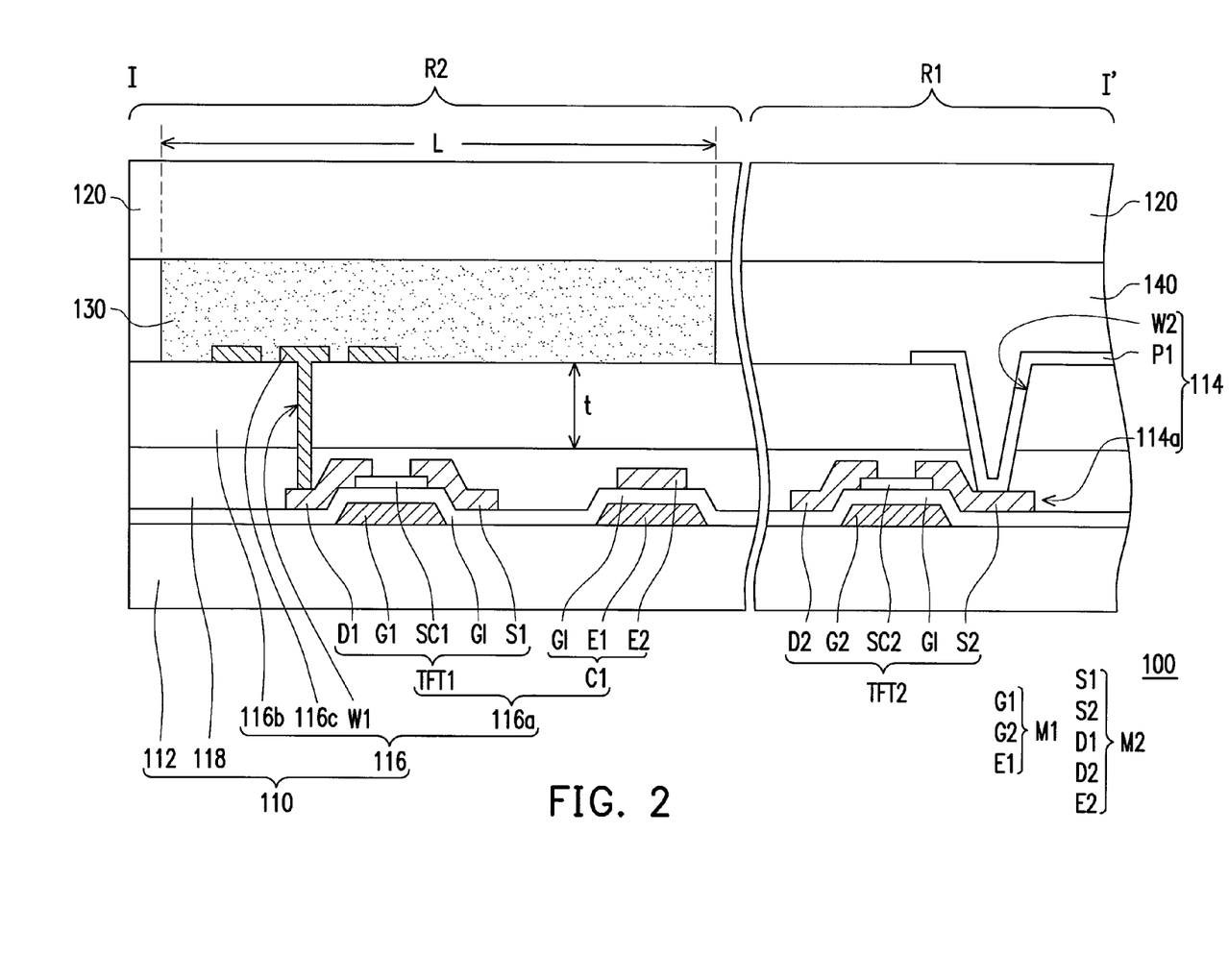
FIG. 2 is a partial cross-sectional view of the display panel of FIG. 1 along the line I-I'.

FIG. 2 is a partial cross-sectional view of the display panel of FIG. 1 along the line I-I'. With reference to FIG. 1 and FIG. 2, in this embodiment, the display panel 100 includes a device substrate 110, an opposite substrate 120, a sealant 130, and a display medium 140. The device substrate 110 includes a substrate 112 and a pixel array 114 and a periphery circuit 116, which are disposed on the substrate 112. The substrate 112 may be a hard substrate or a flexible substrate, and a material of the substrate 112 may include glass, quartz, an organic polymer, or other suitable materials. The pixel array 114 is located in the display region R1, and the periphery circuit 116 is located in the non-display region R2. The periphery circuit 116 includes a driving device 116a, a planarization layer 116b, and a wire 116c. The planarization layer 116b covers the driving device 116a. The wire 116c is located on the planarization layer 116b and electrically connected with the driving device 116a via a contact W1, wherein the wire 116c and the driving device 116a are disposed in a manner of overlapping each other in a direction perpendicular to the substrate 112. For instance, the periphery circuit 116 is a gate driver IC on array (GOA) of a liquid crystal display panel, and the wire 116c is a wire of the GOA. However, it should be noted that the invention is not limited thereto.

To be more specific, in this embodiment, the driving device 116a includes a thin film transistor TFT1 and a capacitor C1. The thin film transistor TFT1 includes a gate G1, a source S1, and a drain D1, wherein a gate insulating layer GI is disposed between the gate G1 and the source/drain S1/D1, and a semiconductor layer SC1 is disposed between the gate insulating layer GI and the source/drain S1/D1, thereby forming the thin film transistor TFT1. The capacitor C1 includes a first electrode E1, a second electrode E2, and the gate insulating layer GI. In this embodiment, the driving device 116a is exemplified as including one thin film transistor TFT1 and one capacitor C1. However, in other embodiments, the driving device may include two or more thin film transistors and two or more capacitors, and an arrangement thereof may be varied to meet the actual requirement and thus is not limited to the descriptions provided here.

In this embodiment, a protection layer 118 is disposed to cover the driving device 116a of the periphery circuit 116 for protecting the thin film transistor TFT1 and the capacitor C1. The planarization layer 116b covers the protection layer 118, and the wire 116c is located on the planarization layer 116b. The planarization layer 116b includes an organic material, and a thickness t of the planarization layer 116b is in a range of about 2-3 micrometers. A material of the wire 116c is a metal or any material having electric conductivity. The wire 116c is electrically connected with the driving device 116a via the contact W1, wherein the contact W1 penetrates the planarization layer 116a and passes through the protection layer 118 for the wire 116c to electrically connect the thin film transistor TFT1 of the driving device 116a via the contact W1. In addition, the wire 116c is disposed above the driving device 116a. That is, the wire 116c and the driving device 116a overlap each other in a vertical projection direction. In FIG. 2, three wires 116c are depicted as an example for illustrating this embodiment. Nevertheless, the invention is not limited thereto, and the number of the wires 116c may be varied according to the actual requirement.

Further to the above, the pixel array 114, disposed on the substrate 112 and located in the display region R1, includes a thin film transistor array 114a and a pixel electrode P1 electrically connected with the thin film transistor array 114a. Although FIG. 2 depicts one thin film transistor TFT2 in the thin film transistor array 114a, the thin film transistor array 114a in fact includes a plurality of thin film transistors, which are omitted from FIG. 2. Likewise, the thin film transistor TFT2 includes a gate G2, a source S2, and a drain D2, wherein a gate insulating layer GI is disposed between the gate G2 and the source/drain S2/D2, and a semiconductor layer SC2 is disposed between the gate insulating layer GI and the source/drain S2/D2, so as to form the thin film transistor TFT2.

In this embodiment, the protection layer 118 that covers the driving device 116a also covers the thin film transistor array 114a of the pixel array 114 for protecting the thin film transistor array 114a. The planarization layer 116b covers the protection layer 118, and the pixel electrode P1 is located on the planarization layer 116b. The pixel electrode P1 is for example a transparent conductive film, formed of an indium tin oxide (ITO) or other suitable transparent conductive materials. The pixel electrode P1 is electrically connected with the thin film transistor TFT2 via a contact W2, wherein the contact W2 penetrates the planarization layer 116b and passes through the protection layer 118, thereby allowing the pixel electrode P1 to electrically connect the thin film transistor TFT2 of the thin film transistor array 114a via the contact W2.

Additionally, in this embodiment, the gate G1 of the thin film transistor TFT1, the gate G2 of the thin film transistor TFT2, and the first electrode E1 of the capacitor C1 are formed of a first metal layer M1. The source/drain S1/D1 of the thin film transistor TFT1, the source/drain S2/D2 of the thin film transistor TFT2, and the second electrode E2 of the capacitor C1 are formed of a second metal layer M2. The gate insulating layer GI is located between the first metal layer M1 and the second metal layer M2. Because the thin film transistor TFT2 of the thin film transistor array 114a and the thin film transistor TFT1 and the capacitor C1 of the driving device 116a all include the first metal layer M1, the second metal layer M2, and the gate insulating layer GI, the first metal layer M1, the second metal layer M2, and the gate insulating layer GI in the display region R1 and the non-display region R2 are respectively formed by the same fabricating processes, so as to simultaneously form the thin film transistor TFT2 of the thin film transistor array 114a of the display region R1 and the thin film transistor TFT1 and the capacitor C1 of the driving device 116a of the non-display region R2.

In this embodiment, the opposite substrate 120 is located opposite to the device substrate 110. The opposite substrate 120 may be a glass substrate, a substrate provided with an electrode film, or a substrate provided with a color filter array. The sealant 130 is located in the non-display region R2 between the device substrate 110 and the opposite substrate 120 for assembling together the device substrate 110 and the opposite substrate 120. The sealant 130 includes a light curing adhesive material, but the invention is not limited thereto. The sealant 130 is disposed in the non-display region R2 and surrounds the display region R1. The sealant 130 is located between the planarization layer 116b of the device substrate 110 and the opposite substrate 120, and the sealant 130 covers the wire 116c of the device substrate 110, so as to dispose the wire 116c between the sealant 130 and the planarization layer 116b. The display medium 140 is located between the device substrate 110, the opposite substrate 120, and the sealant 130. To be more specific, after the device substrate 110 and the opposite substrate 120 are assembled by the sealant 130, a receiving space is formed between the device substrate 110, the opposite substrate 120, and the sealant 130, and the display medium 140 is disposed in the receiving space corresponding to the pixel array 114 located in the display region R1. The display medium 140 is for example a liquid crystal layer, but the invention is not limited thereto.

According to the above, because the wire 116c of the periphery circuit 116 of the device substrate 110 is disposed above the driving device 116a and overlaps the driving device 116a, a transverse area required for disposing the wire 116c is omitted from the device substrate 110, thereby reducing a transverse width of the non-display region R2 of the display panel 100. In this embodiment, a width L of the non-display region R2 of the display panel 100 is about 1000-1500 micrometers. When compared with a conventional display panel that has the wire 116c of the periphery circuit 116 disposed beside the driving device 116a, the display panel 100 of this embodiment has a narrower border. Because the display panel 100 has the narrower border, the size of an electronic device, to which the display panel 100 is applied, is further reduced to increase additional value of the electronic device.

Figure 3:
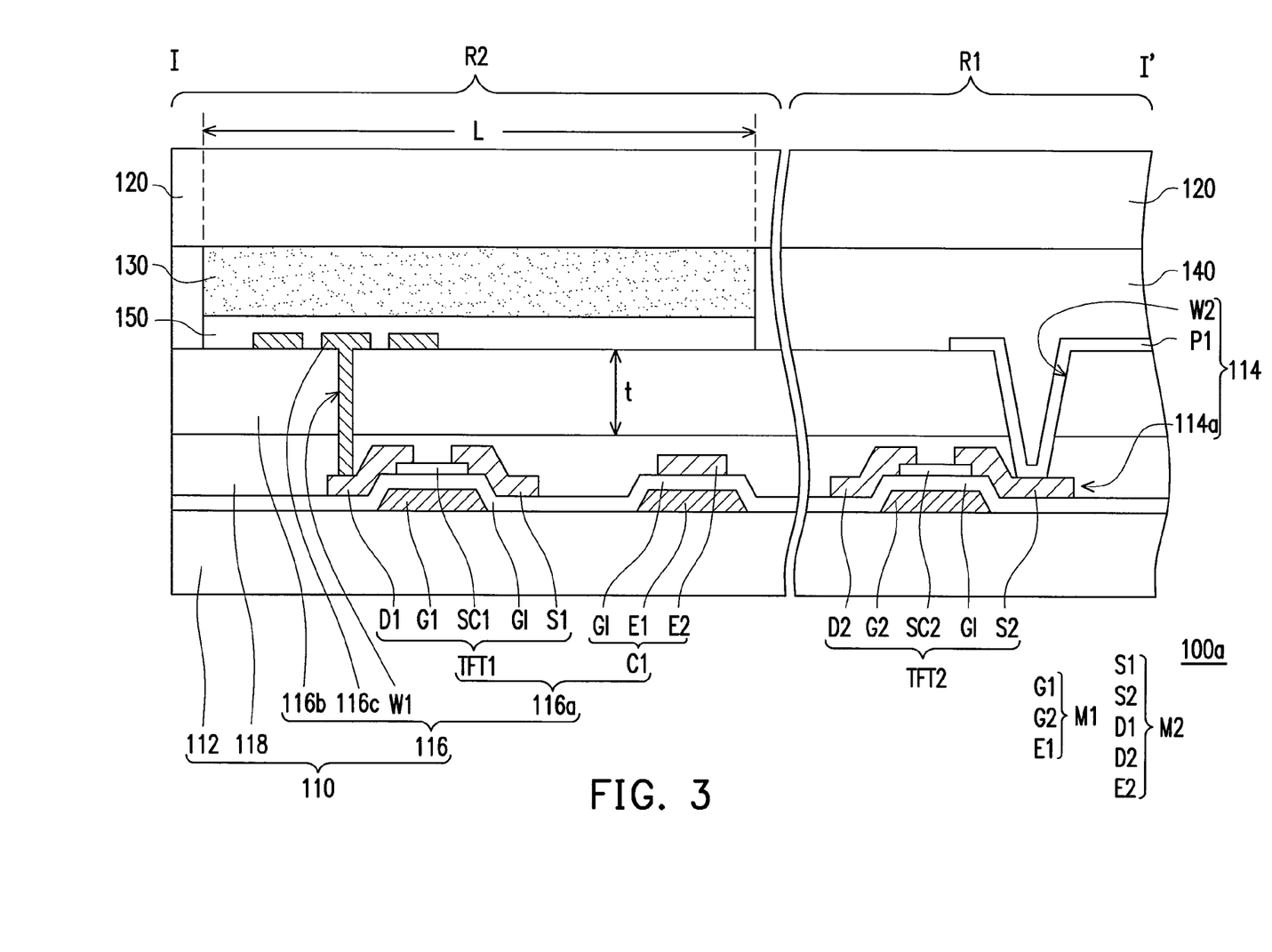
FIG. 3 is a partial cross-sectional view of a display panel along the line I-I' according to another embodiment of the invention.

FIG. 3 is a partial cross-sectional view of a display panel along the line I-I' according to another embodiment of the invention. With reference to FIG. 3, devices of a display panel 100a in this embodiment are similar to the devices of the display panel 100. Thus, the reference numerals of FIG. 2 are used to indicate the same devices in FIG. 3, and detailed descriptions thereof are omitted. A main difference between the display panel 100a and the display panel 100 lies in that the display panel 100a further includes a protection layer 150. The protection layer 150 covers the wire 116c in the non-display region R2. And, the protection layer 150 is located between the planarization layer 116b and the sealant 130. The protection layer 150 includes an inorganic dielectric material, such as SiNx, SiO2, or other suitable materials. The protection layer 150 is located between the planarization layer 116b and the sealant 130 and covers the wire 116c, so as to protect the wire 116c. However, it should be noted that the invention is not limited thereto, and the protection layer 150 may be varied to meet the actual requirement.

Figure 4:
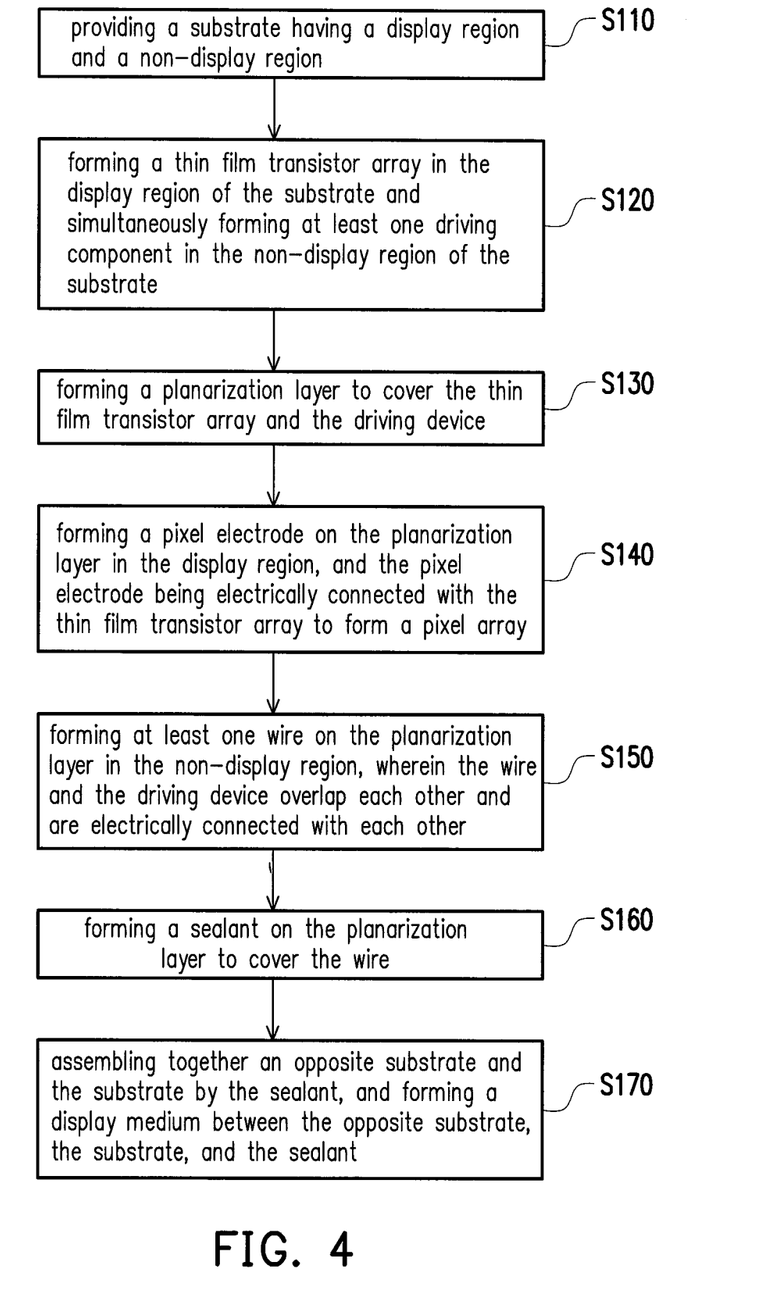
FIG. 4 is a flowchart illustrating a manufacturing method of the display panel of FIG. 2.

FIG. 4 is a flowchart illustrating a manufacturing method of the display panel of FIG. 2. FIG. 5A to FIG. 5G are schematic views illustrating the manufacturing method of the display panel of FIG. 4. The manufacturing method of the display panel 100 is explained in sequence below with reference to FIG. 4 and FIG. 5A to FIG. 5G.

Figure 5A:
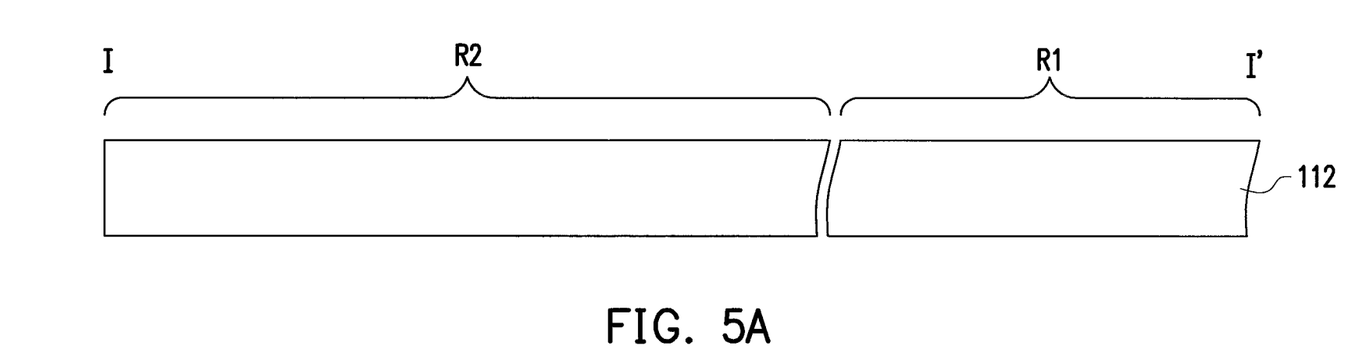
FIG. 5A to FIG. 5G are schematic views illustrating the manufacturing method of the display panel of FIG. 4.
Figure 5B:
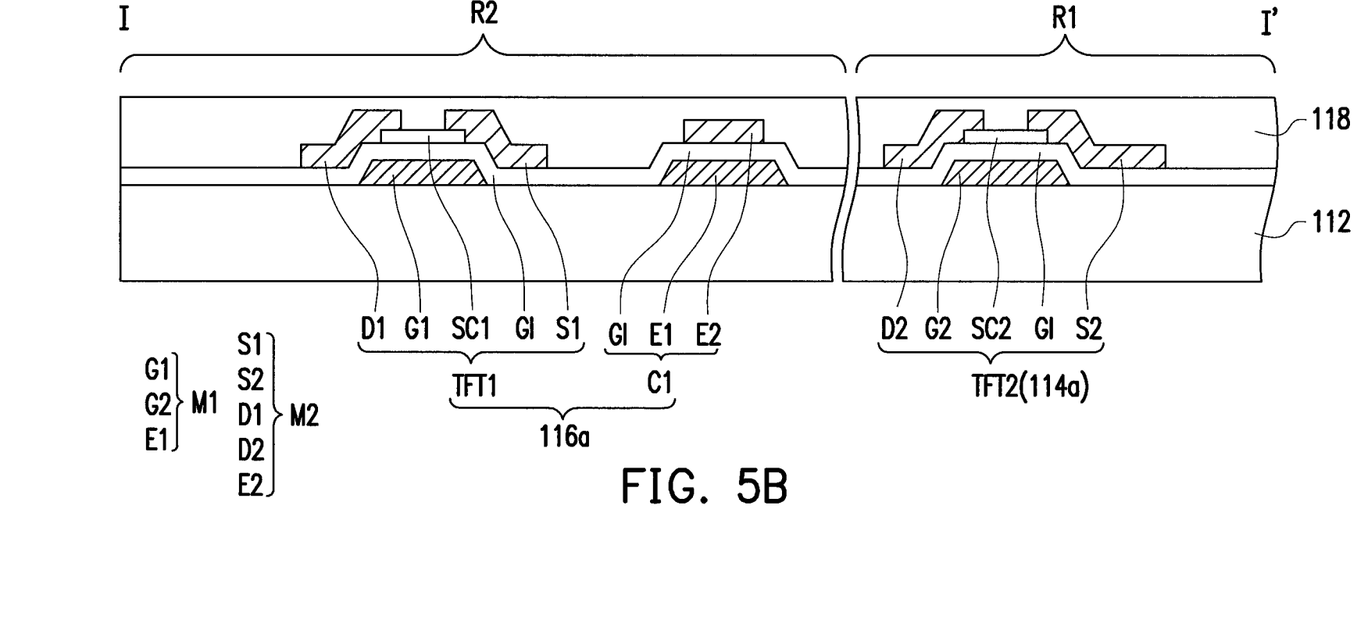

First, with reference to FIG. 4 and FIG. 5A, in Step S110, a substrate 112, which includes a display region R1 and a non-display region R2, is provided, wherein the non-display region R2 surrounds and is adjacent to the display region R1 (as shown in FIG. 1). Next, with reference to FIG. 4 and FIG. 5B, in Step S120, a thin film transistor array 114a is formed in the display region R1 of the substrate 112, and at the same time, at least one driving device 116a is formed in the non-display region R2 of the substrate 112. In FIG. 5B, the driving device 116a is exemplified as including a thin film transistor TFT1 and a capacitor C1. Nevertheless, it should be noted that the driving device 116a may in fact include a plurality of thin film transistors TFT1 or a plurality of capacitors C1. Likewise, the thin film transistor array 114a is exemplified as including a thin film transistor TFT2 in FIG. 5B. However, the thin film transistor array 114a may in fact include a plurality of thin film transistors.

The thin film transistor TFT2 of the thin film transistor array 114a and the thin film transistor TFT1 and the capacitor C1 of the driving device 116a all include the first metal layer M1 and the second metal layer M2. Moreover, the gate insulating layer GI is disposed between the first metal layer M1 and the second metal layer M2. Therefore, the first metal layer M1, the second metal layer M2, and the gate insulating layer GI in the display region R1 and the non-display region R2 are respectively formed by the same fabricating processes, so as to simultaneously form the thin film transistor TFT2 of the thin film transistor array 114a and the thin film transistor TFT1 and the capacitor C1 of the driving device 116a. Other details of the thin film transistors TFT1 and TFT2 and the capacitor C1 are the same as described above, and thus are omitted hereinafter. After forming the thin film transistor array 114a and the driving device 116a on the substrate 112, a protection layer 118 is disposed to cover and protect the thin film transistor array 114a and the driving device 116a.

Figure 5C:
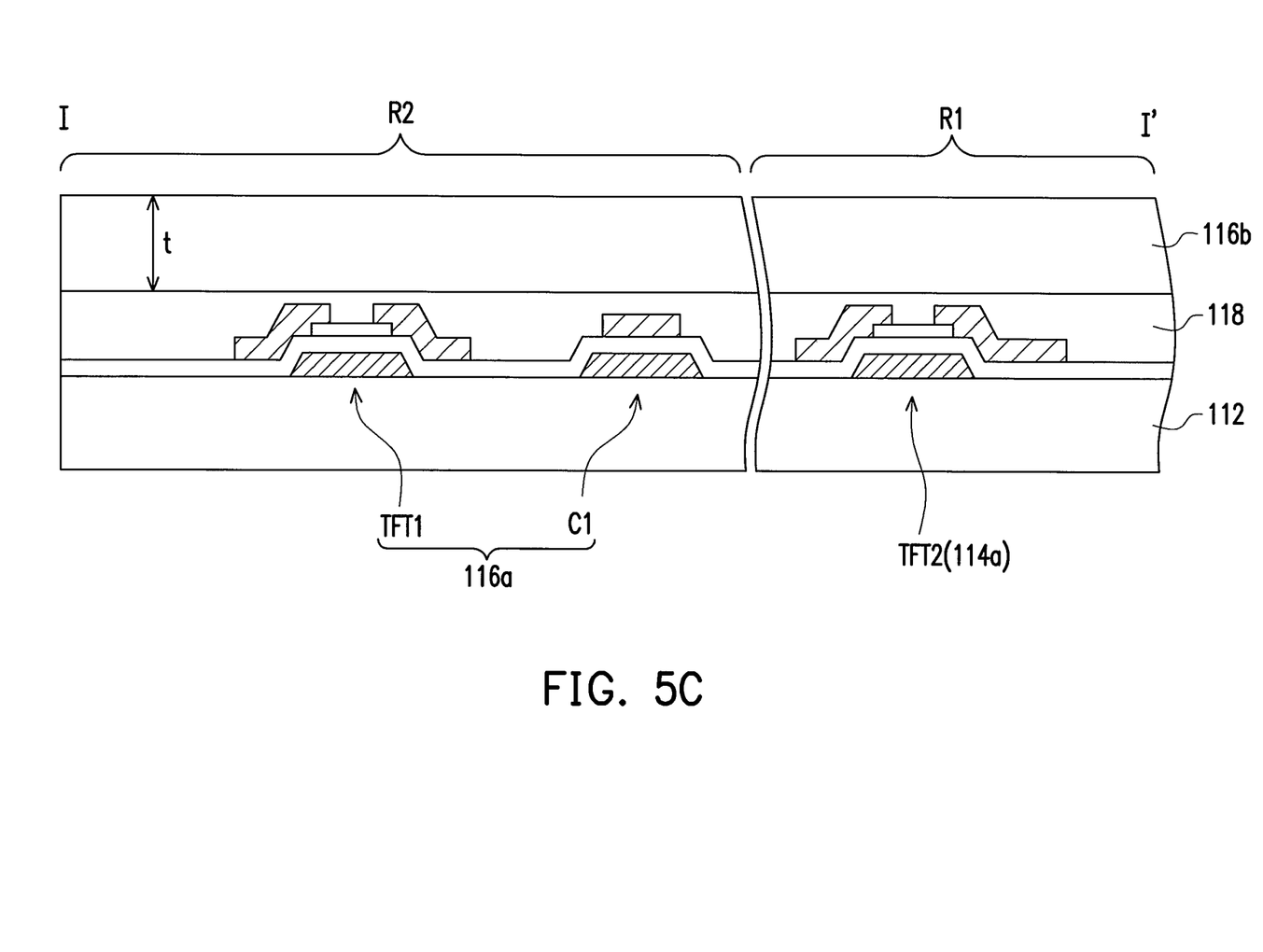
Figure 5D:
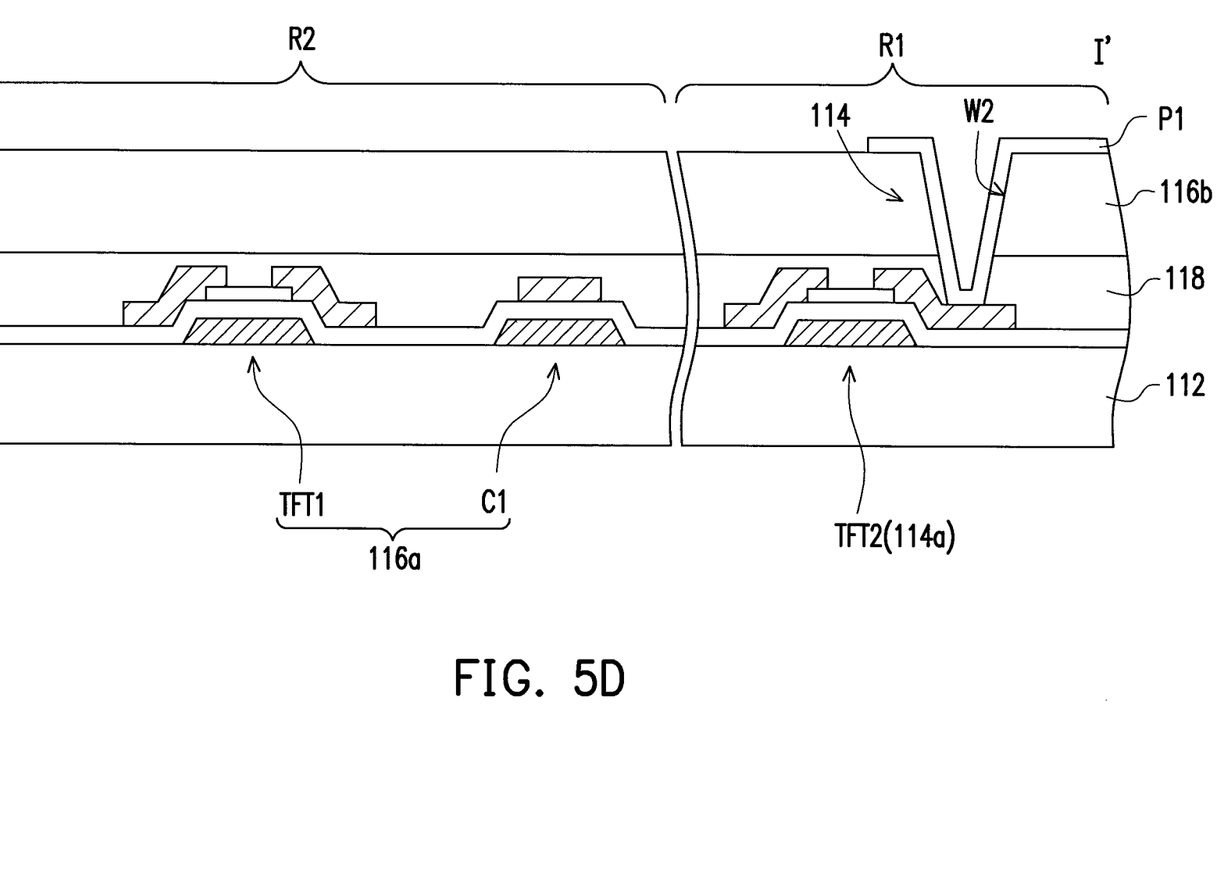
Figure 5E:
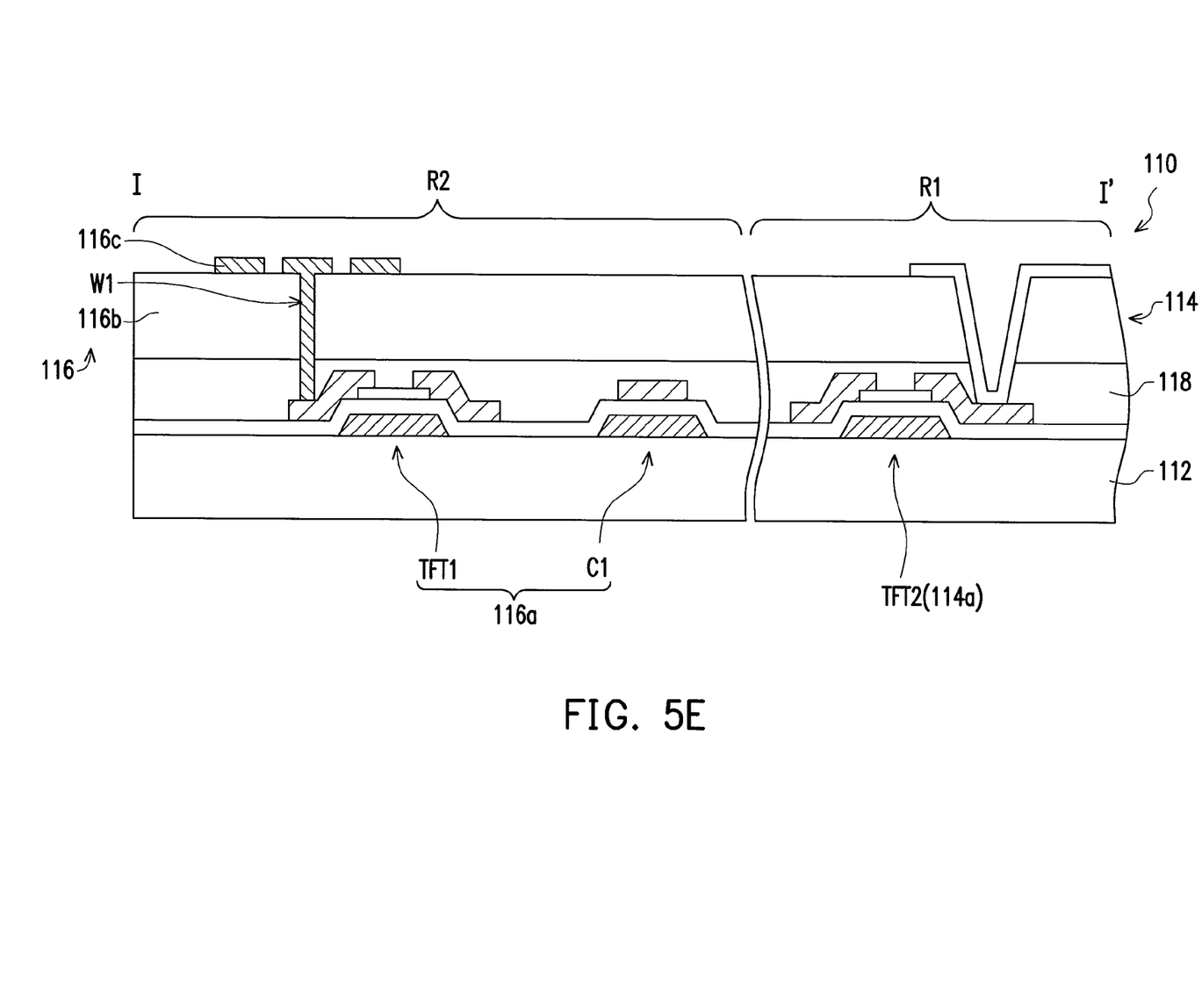

Next, with reference to FIG. 4 and FIG. 5C, in Step S130, a planarization layer 116b is formed on the protection layer 118 to cover the thin film transistor array 114a and the driving device 116a. The planarization layer 116b includes an organic material, and a thickness of the planarization layer 116b is about 2-3 micrometers. Then, referring to FIG. 4 and FIG. 5D, in Step S140, a pixel electrode P1 is formed on the planarization layer 116b in the display region R1. The pixel electrode P1 is electrically connected with the thin film transistor TFT2 of the thin film transistor array 114a so as to form a pixel array 114, wherein the pixel electrode P1 is electrically connected with the thin film transistor TFT2 via a contact W2 that penetrates the planarization layer 116b and passes through the protection layer 118. Thereafter, with reference to FIG. 4 and FIG. 5E, in Step S150, at least one wire 116c is formed on the planarization layer 116b in the non-display region R2, wherein the wire 116c is disposed on the planarization layer 116b above the driving device 116a to overlap the driving device 116a. Moreover, a contact W1 is formed in the planarization layer 116b. The contact W1 penetrates the planarization layer 116b and passes through the protection layer 118, such that the wire 116c is electrically connected with the thin film transistor TFT1 of the driving device 116a via the contact W1, thereby forming a periphery circuit 116. And, the substrate 112, the pixel array 114, and the periphery circuit 116 form a device substrate 110.

Figure 5F:
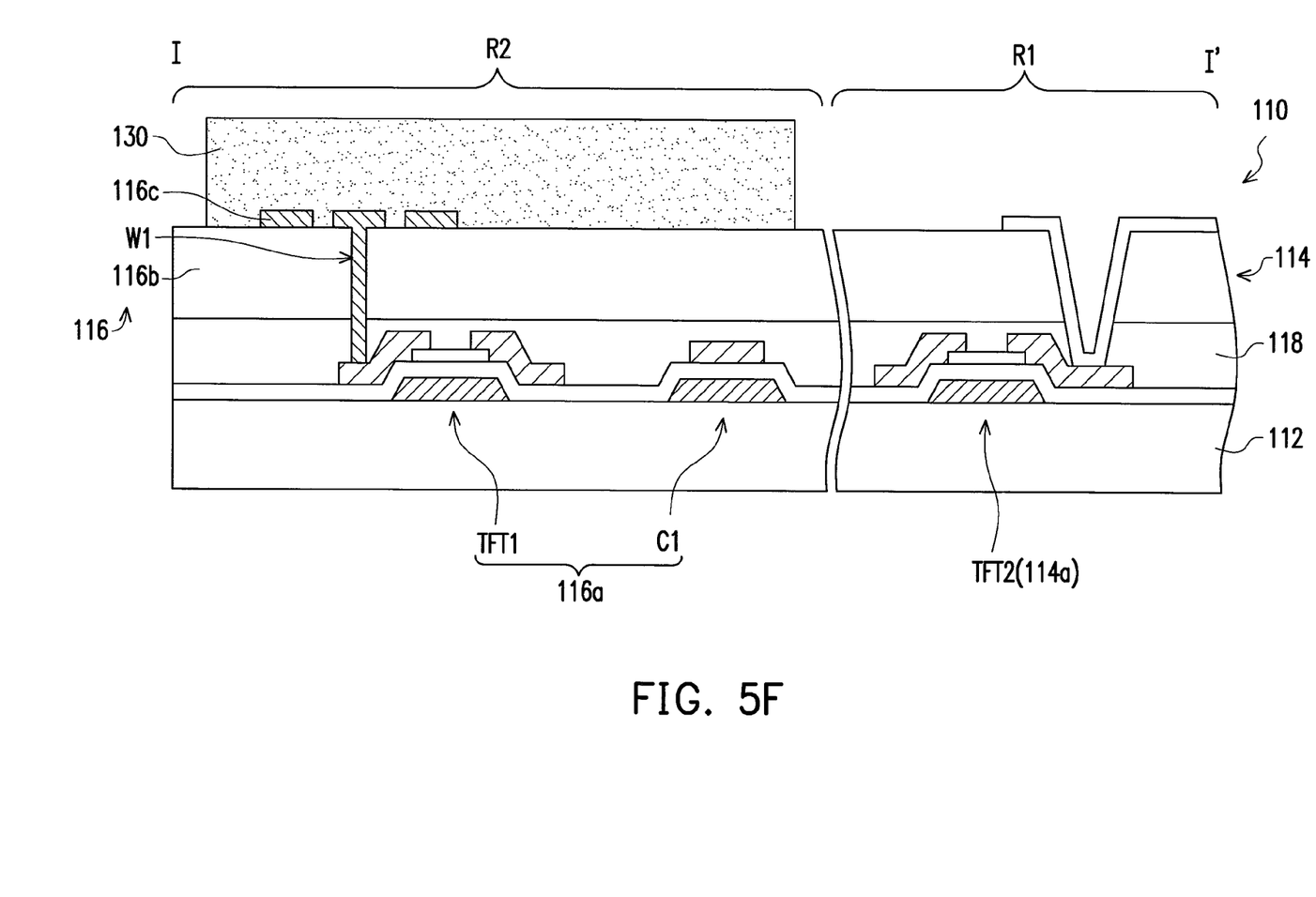
Figure 5G:
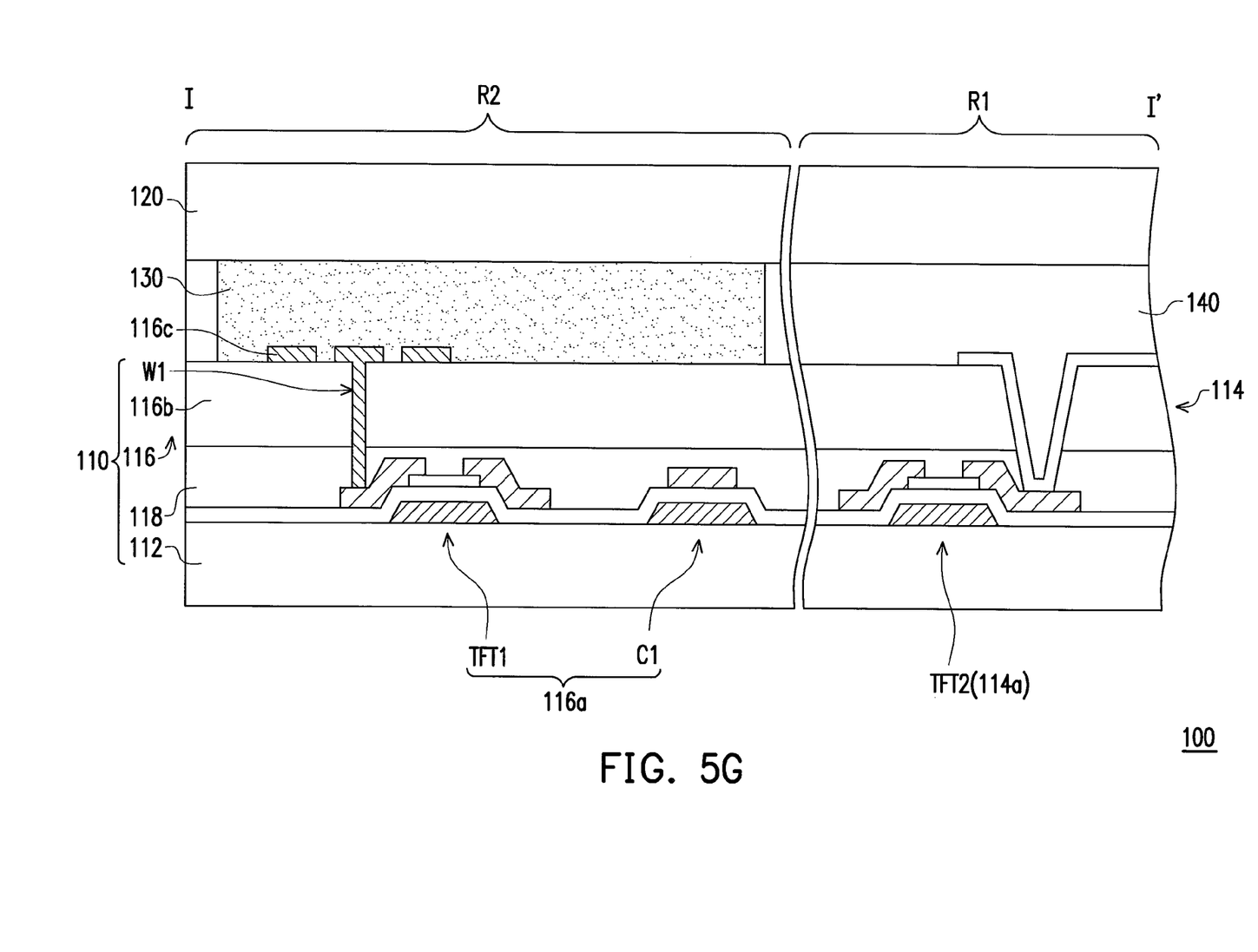

Thereafter, with reference to FIG. 4 and FIG. 5F, in Step S160, a sealant 130 is formed on the planarization layer 116b to cover the wire 116c. In other embodiments, a protection layer 150 may be formed on the wire 116c to cover the wire 116c after the wire 116c is formed. The protection layer 150 includes an inorganic dielectric material for protecting the wire 116c. Details about the structure and position thereof are illustrated in FIG. 3 and thus are omitted hereinafter. Please note that whether the protection layer 150 is disposed should not be construed as a limitation to the invention. Lastly, with reference to FIG. 4 and FIG. 5G, in Step S170, the opposite substrate 120 and the substrate 112 (device substrate 110) are assembled together by the sealant 130. Moreover, a display medium 140 is formed between the opposite substrate 120, the substrate 112 (device substrate 110), and the sealant 130. More specifically, after the device substrate 110 and the opposite substrate 120 are assembled, an irradiation process is performed on the sealant 130 to cure the sealant 130 and further to fix the opposite substrate 120 and the device substrate 110. Then, the display medium 140 is disposed between the opposite substrate 120, the device substrate 110, and the sealant 130 to form a display panel 100.

Through the aforementioned steps, the manufacturing method of the display panel 100 of the invention disposes the wire 116c of the periphery circuit 116 of the device substrate 110 above the driving device 116a to overlap the driving device 116a, so as to omit a transverse area, required for disposing the wire 116c, from the device substrate 110. As a result, the transverse width of the non-display region R2 of the display panel 100 is reduced. Accordingly, the manufacturing method of the invention is applicable for manufacturing the display panel 100 with the narrow border design.

In conclusion of the above, according to the display panel and the manufacturing method of the invention, the periphery circuit of the device substrate is disposed in the non-display region, and the pixel array is disposed in the display region, wherein the driving device of the periphery circuit and the thin film transistor array of the pixel array are formed by the same fabricating processes, and the driving device and the thin film transistor array are covered by the planarization layer. The wire of the periphery circuit is located on the planarization layer and electrically connected with the driving device via the contact. Moreover, the wire and the driving device overlap each other in the direction perpendicular to the substrate, so as to reduce the width of the non-display region of the display panel. Accordingly, the display panel of the invention has the narrow border design, and the manufacturing method of the invention is applicable for manufacturing the display panel with the narrow border design.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A display panel, having a display region and a non-display region, the display panel comprising:
    a device substrate, comprising a substrate and a pixel array and a periphery circuit disposed on the substrate, wherein the pixel array is located in the display region and the periphery circuit is located in the non-display region, and the periphery circuit comprises:
        at least one driving device;
        a planarization layer covering the driving device; and
        at least one wire located on the planarization layer, wherein the wire and the driving device are electrically connected with each other and overlapped each other;
    an opposite substrate located opposite to the device substrate;
    a sealant located in the non-display region between the device substrate and the opposite substrate to assemble the device substrate and the opposite substrate together, wherein the sealant covers the wire of the device substrate, and the wire is disposed and sandwiched in between the sealant and the planarization layer; and
    a display medium located between the device substrate, the opposite substrate, and the sealant.

2. The display panel according to claim 1, wherein the planarization layer comprises an organic material, and a thickness of the planarization layer is substantially 2~3 micrometers.

3. The display panel according to claim 1, wherein the sealant comprises a light curing adhesive material.

4. The display panel according to claim 1, further comprising a protection layer covering the wire and located between the planarization layer and the sealant.

5. The display panel according to claim 4, wherein the protection layer comprises an inorganic dielectric material.

6. The display panel according to claim 1, wherein the driving device comprises at least one thin film transistor and at least one capacitor, and the wire and the thin film transistor are electrically connected with each other.

7. The display panel according to claim 1, wherein the pixel array comprises a thin film transistor array and a pixel electrode electrically connected with the thin film transistor array, the planarization layer covers the thin film transistor array, and the pixel electrode is located on the planarization layer.

8. The display panel according to claim 1, wherein a width of the non-display region is substantially 1000~1500 micrometers.

9. A method for manufacturing the display panel according to claim 1, the method comprising:
    providing the substrate having the display region and the non-display region;
    forming a thin film transistor array in the display region of the substrate and simultaneously forming the driving device in the non-display region of the substrate;
    forming the planarization layer to cover the thin film transistor array and the driving device;
    forming a pixel electrode on the planarization layer in the display region, and the pixel electrode being electrically connected with the thin film transistor array to form the pixel array;
    forming the wire on the planarization layer in the non-display region, wherein the wire and the driving device overlap each other and are electrically connected with each other;

forming the sealant on the planarization layer to cover the wire, such that the wire is disposed and sandwiched in between the sealant and the planarization layer; and assembling the opposite substrate and the substrate together by the sealant, and forming the display medium between the opposite substrate, the substrate, and the sealant.

10. The manufacturing method according to claim 9, wherein the planarization layer comprises an organic material, and a thickness of the planarization layer is substantially 2~3 micrometers.

11. The manufacturing method according to claim 9, further comprising performing an irradiation process on the sealant to cure the sealant.

12. The manufacturing method according to claim 9, further comprising forming a protection layer on the wire to cover the wire after forming the wire.

13. The manufacturing method according to claim 12, wherein the protection layer comprises an inorganic dielectric material.

14. The manufacturing method according to claim 9, wherein the driving device comprises at least one thin film transistor and at least one capacitor, and the wire and the thin film transistor are electrically connected with each other.

* * * * *